US006403753B1

(12) United States Patent
Loy et al.

(10) Patent No.: US 6,403,753 B1
(45) Date of Patent: Jun. 11, 2002

(54) METHOD OF MAKING THERMALLY REMOVABLE POLYURETHANES

(75) Inventors: Douglas A. Loy; David R. Wheeler, both of Albuquerque, NM (US); James R. McElhanon, Livermore, CA (US); Randall S. Saunders, deceased, late of Albuquerque; Marvie Lou Durbin-Voss, legal representative, Albuquerque, both of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/863,173

(22) Filed: May 22, 2001

Related U.S. Application Data

(63) Continuation-in-part of application No. 09/484,346, filed on Jan. 18, 2000, now abandoned.

(51) Int. Cl.[7] .............................................. C08G 18/62
(52) U.S. Cl. .............................. 528/73; 528/49; 528/75
(58) Field of Search ............................. 528/49, 73, 75

(56) References Cited

U.S. PATENT DOCUMENTS

| 4,687,812 A | 8/1987 | Dickie et al. ................ 525/112 |
| 5,491,210 A | 2/1996 | Onwumere et al. ........... 528/28 |
| 5,641,856 A | 6/1997 | Meurs ......................... 528/310 |
| 5,726,391 A | 3/1998 | Iyer et al. ................... 174/52.2 |
| 5,760,337 A | 6/1998 | Iyer et al. ................... 174/52.2 |

OTHER PUBLICATIONS

Patel, H. and Vyas, H., "Poly(urethane–imide)s–1," Eur. Polym. J., 1991, 27, 1, 93–96.
Laita, H., Boufi, S., and Gandini, A., "The application of the Diels–Alder reaction to polymers bearing furan moieties. 1. Reactions with maleimides," Eur. Polym. J., 1997, 33, 8, 1203–1211.

Primary Examiner—Rachel Gorr
(74) Attorney, Agent, or Firm—Elmer A. Klavetter

(57) ABSTRACT

A method of making a thermally-removable polyurethane material by heating a mixture of a maleimide compound and a furan compound, and introducing alcohol and isocyanate functional groups, where the alcohol group and the isocyanate group reacts to form the urethane linkages and the furan compound and the maleimide compound react to form the thermally weak Diels-Alder adducts that are incorporated into the backbone of the urethane linkages during the formation of the polyurethane material at temperatures from above room temperature to less than approximately 90° C. The polyurethane material can be easily removed within approximately an hour by heating to temperatures greater than approximately 90° C. in a polar solvent. The polyurethane material can be used in protecting electronic components that may require subsequent removal of the solid material for component repair, modification or quality control.

32 Claims, 6 Drawing Sheets

| | Compound Designation |
|---|---|
|  | 1A |
|  | 2A |
|  | 3A |
|  (n = 2,3,4) | 4A |
|  (n = 3,4) | 5A |

| | Compound Designation |
|---|---|
|  | 1B |
|  | 2B |
|  | 3B |
|  | 4B |
|  | 5B |
|  | 6B |

METHOD OF MAKING THERMALLY REMOVABLE POLYURETHANES

RELATED APPLICATIONS

This application is a continuation-in-part of U.S. patent application Ser. No. 09/484,346, filed on Jan. 18, 2000, now abandoned.

This invention was made with Government support under Contract No. DE-AC04-94AL85000 awarded by the Department of Energy. The Government has certain rights in the invention.

BACKGROUND OF THE INVENTION

The invention relates to thermally-removable polyurethanes. More particularly, the invention relates to thermally-removable polyurethanes prepared using the Diels-Alder cycloaddition reaction and their method of making.

Polyurethanes are commercially used as solids or foams for a wide variety of applications. Polyurethanes are useful because they can provide flexibility combined with structural integrity, including resistance to solvents and mechanical strength. For example, electronic components can be potted using polyurethanes to protect the component from adverse environments. However, situations occur which require subsequent access to the components, necessitating using a potting material that is easily removable. Current techniques, such as those used for traditional urethane foams, involve labor-intensive mechanical removal, thereby posing a substantial threat for component damage during material removal as well as increased expense for such labor intensive methodologies.

Polyurethanes result from the irreversible, non-equilibrium reaction of diols (compounds with two alcohol functional groups), or more generally, polyols (compounds with at least two alcohol functional groups) with isocyanates (such as diisocyanates, or more generally, polyisocyanates). Contrary to most other step growth reactions, urethane formation does not involve release of a small molecule such as $H_2O$, HCl, $CH_3OH$ and other like molecules. Although the reaction is possible in the absence of a catalyst, tertiary amines and metal salts can accelerate the reaction rate significantly.

Two side reactions can occur upon polyurethane synthesis: formation of both allophanate biuret linkages from an isocyanate functionality and an already existing urethane link. Both reactions not only affect stoichiometry, but also introduce branching, yielding cross-linked species. Polyurethanes can thus be formed through the branching and cross-linking.

In forming the polyurethanes, both physical and chemical cross-linking can occur. Diols used in polyurethane synthesis have a very flexible backbone, The urethane link, however, tends to be rigid. In the resulting polymer with these two components, the flexible backbones tend to aggregate, forming what are called soft segments, and the rigid urethane links tend to aggregate to form what are called hard segments. The hard segments do not dissociate easily and thus create physical, rather than chemical, cross-links in the polyurethane material. This provides further mechanical strength and solvent resistance. In order for this material to be thermally processable to remove the polyurethane material, it must be heated up above the melting point of these hard segments. This melting point temperature is typically quite high, generally between approximately 150° C. and 200° C., causing degradation of the polyurethane chain.

Due to these type of cross-links that are typically present in polyurethanes, the polyurethane materials become difficult to melt process (i.e., process the material at a temperature at which the material flows), and difficult to remove once it is potted. If a polyurethane could be made to thermally break into fragments under mild thermal treatment, and then have the fragments rejoin as the material is cooled down, it would be a thermally reversible polyurethane that would provide a method for easy removal as well as easy melt processing. This type of material could be useful as a removable material for applications where melt processing is desired. In industrial terms, this material would combine the benefits of both a thermoplastic and a thermoset.

Addressing the need for materials that are easier to melt process, Onwumere et al. (U.S. Pat. No. 5,491,210, issued on Feb. 13, 1996) describe polymers having thermally reversible bonds, such a thermally reversible aromatic urethane bonds, adapted to evanesce at an elevated temperature. The reactions forming the polymeric material occur at temperatures from 80–200° C. and more generally above approximately 120° C. The formed polymers are apparently melt processable generally above approximately 170° C.

Patel and Vyas (Patel, H. S., and Vyas, H. S., Eur. Polym. J., 1991, 27(1), 93–96) describe syntheses of poly(urethane-imides) prepared by Diels-Alder reaction to contain both urethane linkages and furan-maleimide Diels-Alder adducts. The materials are made by first synthesizing a bis-furan functionalized compound containing two urethane linkages which is then reacted with bis-maleimides to make the polyurethane. The materials are then converted to a non-reversible polymer through additional reactions which converts the furan-maleimide Diels-Alder adduct to an imide linkage to form the poly(urethane-imide) material.

Laita et al. (Laita, H. Boufi, S., and Gandini, A., Eur. Polym. J., 1997, 33(3), 1203–1211) also describe synthesis of polyurethanes prepared with Diels-Alder adduct linkages, with the linkages present in the branches and not the backbone of the polymer. Laita et al. describe polymeric components functionalized with furans rather than with discrete molecules. Laita et al. note that attempts to return to linear structures by heating were not successful.

Useful would be materials that can be have the advantageous structural characteristics of polyurethane materials but also can be easily and efficiently removed through heating at mild temperatures that do not harm the components which are encapsulated by the polyurethane material.

DESCRIPTION OF SPECIFIC EMBODIMENTS

Figure 1:
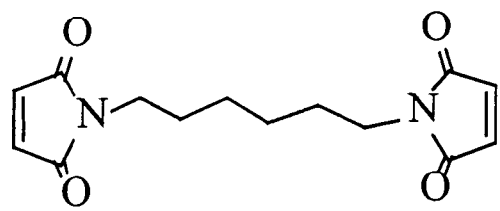
FIG. 1 shows typical bis(maleimide) compounds that can be used in the present invention.
Figure 1:
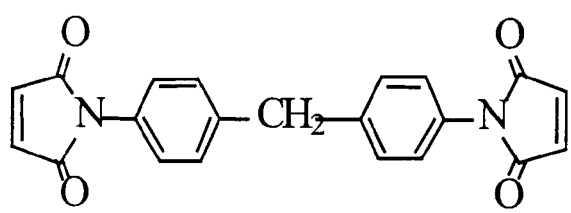
Figure 1:
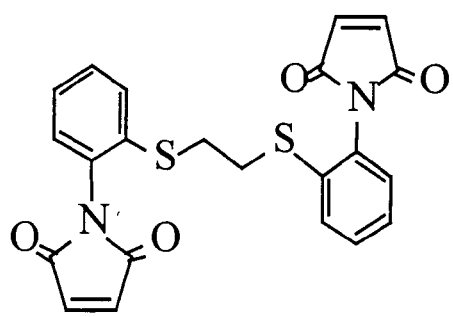
Figure 1:
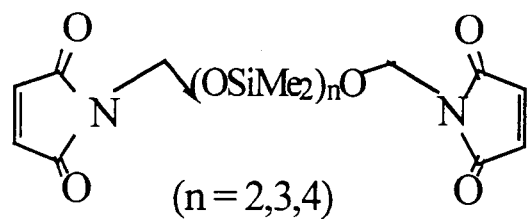
Figure 1:
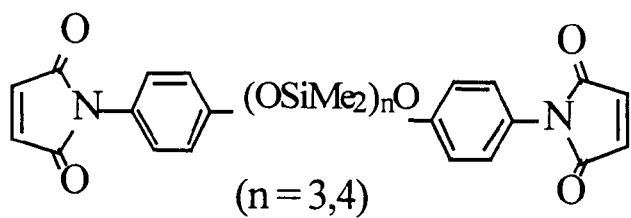

Diels-Alder reactions between a diene and a dienophile, typically reversible, are known and potentially useful in forming cross-linked materials. The rate of reaction between a diene and dienophile is determined by the diene and dienophile used. Likewise the rate of the reverse reaction (for depolymerization) is also determined by the individual components and the substituents on them. Typically, upon heating, the position of the equilibirum between adduct, and dienophile/diene shifts to increase the amount of the diene and dienophile. As shown as follows, the reversible Diels-Alder reaction of a maleimide, the dienophile, with functional group R, and a furan, the diene, with functional group R', is known to proceed forward rapidly at 60° C.; however, at a higher temperature, depending upon the particular reactants used, the equilibrium shifts to regenerate the maleimide and furan groups.

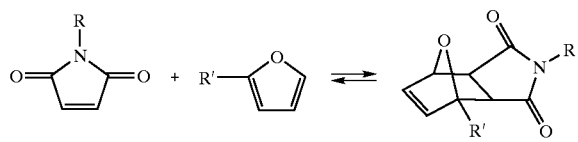

A wide variety of functional groups are tolerated by the Diels-Alder reaction. In general, any organic functional group can be used for R or R' where the functional group does not undergo a preferential Diels-Alder reaction.

According to the present invention, a thermally reversible or thermally removable polyurethane material is prepared by mixing a maleimide compound and a furan compound, wherein at least one of the maleimide compound and the furan compound is functionalized as an alcohol, an isocyanate compound, or both to form a mixture. This mixture is then cured with an alcohol (or more generally a polyol) if the functional group is an isocyanate (or more generally, a polyisocyanate) compound or cured with an isocyanate compound if the functional group is an alcohol. The method of the present invention requires that both an alcohol-containing compound and an isocyanate-containing compound be present to form the thermally-removable polyurethane material. The use of the maleimide and the furan groups yields a Diels-Alder adduct that serves as a thermally reversible linkage that can be disrupted at a moderately elevated temperature. To enhance the ease of formation of the polyurethane materials of the present invention, both the maleimide-containing compound, preferably a bis (maleimide), and the furan-containing compounds are preferably liquids at a temperature of less than 60° C. and more preferably at less than approximately room temperature. However, one reactant compound can be a solid at 60° C. if it is soluble in one of the other reactants such that the mixture is a liquid at approximately 60° C. The formed polyurethane material can be heated at temperatures of greater than approximately 90° C. in the presence of a solvent to remove or rework the polyurethane material. Heating without a solvent softens the polyurethane material but does not allow removal. The solvent used must have a boiling point greater than the heating temperature.

The bis(maleimide) according to the present invention is of the general structure

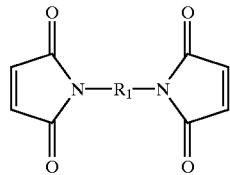

where $R_1$ is any organic group that does not undergo a preferential Diels-Alder reaction and preferably such that the bis(maleimide) remains as a liquid at approximately 60° C. or less, and more preferably is a liquid at approximately room temperature.

Preferably, both the diene, the monomeric furan, and the dienophile, the bis(maleimide), are liquids near room or slightly elevated temperatures in the present invention or are soluble in one of the other reactants such that the mixture of the bis(maleimide) and furan compounds is a liquid at approximately 60° C. While preparation of the polyurethane materials with one or more components in the solid phase at room temperature is possible, the reaction must be done under high temperature conditions because these higher temperatures are required to liquefy and solubilize the reactants prior to reaction. This can be troublesome and limit the time between mixing and use. In the present invention, the mixture of the preferred reactants are liquids at temperatures less than 60° C. and the bis(maleimide) and monomeric furan compounds can therefore be intimately mixed and reacted at temperatures from approximately 60° C. to approximately 90° C. to rapidly polymerize and encapsulate a component. Any curing temperature below approximately 90° C. is acceptable. Elevated temperatures (e.g., greater than 60° C.) will, however, promote a faster cure rate.

Most commercially available bis(maleimides) are solids at room temperatures. A series of bis(maleimide) compounds that were synthesized for use in the present invention are shown in FIG. 1. Compounds 1A, 2A, 3A, and 4A (n=2,3,4) are known in the art. Compound 5A (n=3,4) is considered to be novel and was synthesized as described in the Examples for the method of the present invention. Compounds 1A, 2A, 3A, 4A (n=2,3,4), 5A (n=3), and 5A (n=4) have the chemical formula $(C_4H_2O_2N)_2(CH_2)_6$, $((C_4H_2O_2N)C_6H_4)_2CH_2$, $((C_4H_2O_2N)CH_6H_4)_2(SCH_2)_2$, $((C_4H_2O_2N)CH_2)_2(OSi(CH_3)_2)_2O$, $((C_4H_2O_2N)CH_2)_2(OSi(CH_3)_2)_3O$, $((C_4H_2O_2N)CH_2)_2(OSi(CH_3)_2)_4O$, $((C_4H_2O_2N)C_6H_4)_2(OSi(CH_3)_2)_3O$, and $((C_4H_2O_2N)C_6H_4)_2(OSi(CH_3)_2)_4O$, respectively.

The compounds shown in FIG. 1 are hereafter referred to with the designated alpha-numerical identifiers for ease of discussion. When the compounds shown in FIG. 1 are cured with an appropriately functionalized furan, and a diol or diisocyanate, the formed polyurethane will depolymerize at approximately 90° C. or higher in the presence of a solvent, allowing an encapsulated component to be removed or the polyurethane reworked.

Bis(maleimide) compound 5A is useful in the present invention because the benzene ring directly attached to the maleimide improves the reaction kinetics of the maleimide, and elevates the glass transition temperature of the cured polymer network. Additionally, compound 5A (n=3) is a liquid at less than approximately 30° C. and compound 5A (n=4) is a liquid at a temperature less than approximately 60° C. Another important feature of the present invention is that more than one bis(maleimide) compound can be used in preparing the crosslinked polyurethane material. More than one bis(maleimide) compound can be used to aid in tailoring the characteristics of the reaction and the resulting polyurethane material.

Figure 2:
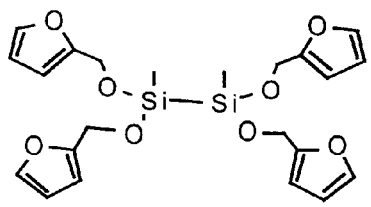
FIG. 2 shows typical monomeric furan compounds that can be used in the present invention.
Figure 2:
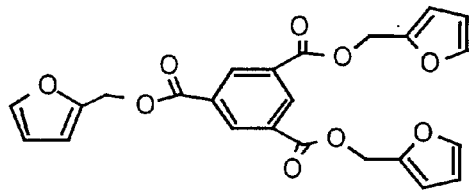
Figure 2:
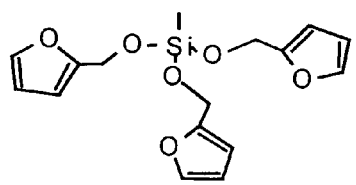
Figure 2:
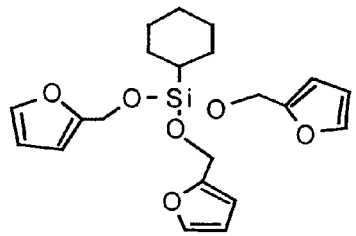
Figure 2:
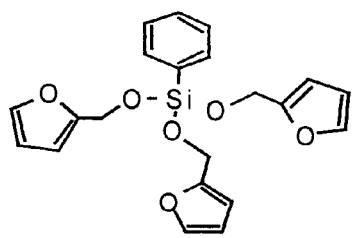
Figure 2:
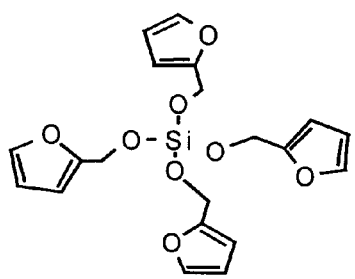

Importantly, according to the present invention, only monomeric furans are used in the reaction with the maleimide compounds, with the compounds appropriately functionalized with alcohol and isocyanate groups to form the polyurethane materials. However, as clear to those skilled in the art, the multifunctional diene need not be limited to just 2-substituted furans. However, due to their ease of manipulation and functionalization and economic suitability, 2-substituted furans, especially those derived from 2 furfuryl alcohol are especially attractive. Examples of tris(furans) and tetrakis(furans) that can be used in the present invention include, but are not limited to, the compounds shown in FIG. 2. The preferred compounds, such as 3B, 4B, 5B, and 6B, are those that are liquids at less than 60° C. and are made from relatively inexpensive starting materials. The compounds shown in FIG. 2 are hereafter referred to with the designated alpha-numerical identifiers for ease of discussion. Compounds 1 B, 2B, 3B, 4B, 5B and 6B have the chemical formula $((C_4H_3O)CH_2O)_4(SiCH_3)_2$, $(((C_4H_3O)CH_2O)CO)_3C_6H_3$, $((C_4H_3O)CH_2O)_3SiCH_3$, $((C_4H_3O)CH_2O)_4(SiCH_3)_2$, $((C_4H_3O)CH_2O)_3SiC_6H_5$, and $((C_4H_3O)CH_2O)_4Si$, respectively.

Common diisocyanate compounds that can be used in the present invention include, but are not limited to, toluene-2, 4-diisocyanate, toluene-2,6-diisocyanate, diphenyl-4,4'-diisocyanate, diphenylmethane-4,4'-diisocyanate, 3,3'-dimethyldiphenyl-4,4'-diisocyanate, 3,3'-dimethoxyd iphenyl-4,4'-diisocyanate, 3,3'-dichlorodiphenylmethane-4, 4'-diisocyanate, chlorophenylene-2,4-diisocyanate, hexamethylene diisocyanate, naphthylene-1,5-diisocyanate, naphthylene-1,4-diisocyanate, naphthylene-2,7-diisocyanate, p-xylene diisocyanate, m-xylene diisocyanate, dicyclohexylmethane diisocyanate, 2-nitrodiphenyl-4,4'-diisocyanate, 2-nitrodiphenylmethane-4,4'-diisocyanate, diphenylmethanesulphone-4,4'-diisocyanate, diphenylsulphone-4,4'-diisocyanate, fluorene diisocyanate, and chrysene diisocyanate.

Common polyols (that is, compounds with multiple alcohol functional groups) include, but are not limited to, glycerol, triethanolamine, pentaerythritol, diethylene glycol, ethylene glycol, 1,3-propane diol, 1,4-butane diol, 1,5-pentane diol, 1,6-hexane diol, p-bis($\beta$-hydroxyethoxy) benzene, trimethylolpropane, 1,2-propylene glycol, and polypropylene glycol.

Figure 3:
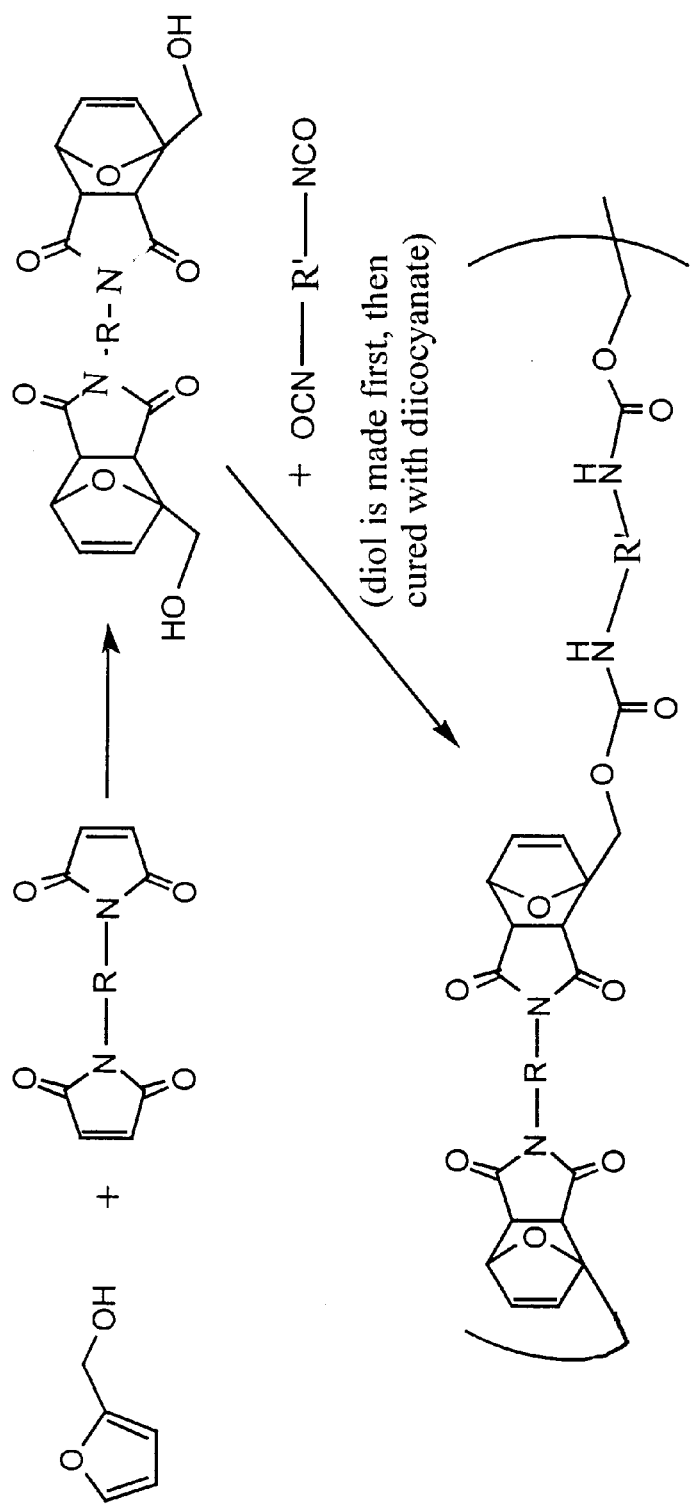
FIG. 3 shows one embodiment of the method of the present invention.

According to one embodiment of the present invention, a method is provided of making a thermally removable polyurethane by mixing a maleimide compound, such as a bismaleimide, a trismaleimide, or a tetrakis maleimide) with a furan compound functionalized with an alcohol to form a mixture and then curing this mixture with an isocyanate, or more generally, a polyisocyanate, at less than approximately 90° C. and preferably at approximately 60° C., as illustrated in FIG. 3. The Diels-Alder adduct formed by the maleimide and furan are incorporated into the backbone of the polymer. Preferred are reactants in which a polymeric network is formed within approximately 10 minutes and most preferred are liquid reactants. The polymeric network formed can be depolymerized at approximately 90° C. Depolymerization experiments demonstrated that the solid crosslinked polymeric network dissolves completely into a polar solvent, such as N,N-dimethylacetamide, within approximately 1 hr upon warming to 90° C.

Any polar solvent that has a boiling temperature of 90° C. or higher will promote the retro Diels-Alder reaction. The solvent should be able to dissolve each of the monomeric components as the Diels-Alder adducts are dissociated. Suitable solvents include n-butanol, N,N-dimethylacetamide (DMAC), methyl sulfoxide (DMSO), and N,N-dimethylformamide (DMF).

Figure 4:
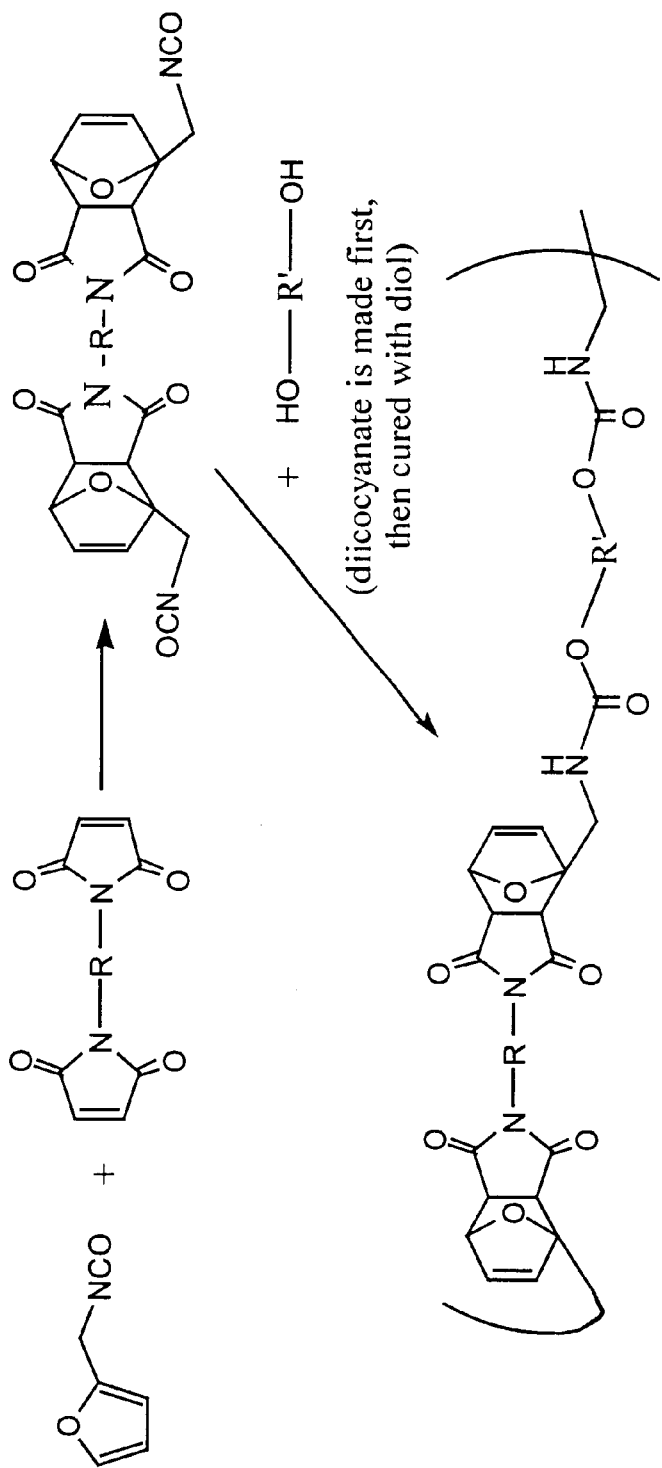
FIG. 4 shows one embodiment of the method of the present invention.

In another embodiment, illustrated in FIG. 4, a method is provided of making a thermally removable polyurethane by mixing a maleimide compound, such as a bismaleimide, a trismaleimide, or a tetrakis maleimide) with a furan compound functionalized with an isocyanate to form a mixture and then curing this mixture with a polyol at less than approximately 90° C. and preferably less than 60° C. The Diels-Alder adduct formed by the maleimide and furan are incorporated into the backbone of the polymer. Preferred are reactants in which a polymeric network is formed within approximately 10 minutes and most preferred are liquid reactants. The polymeric network formed can be depolymerized at approximately 90° C.

Figure 5:
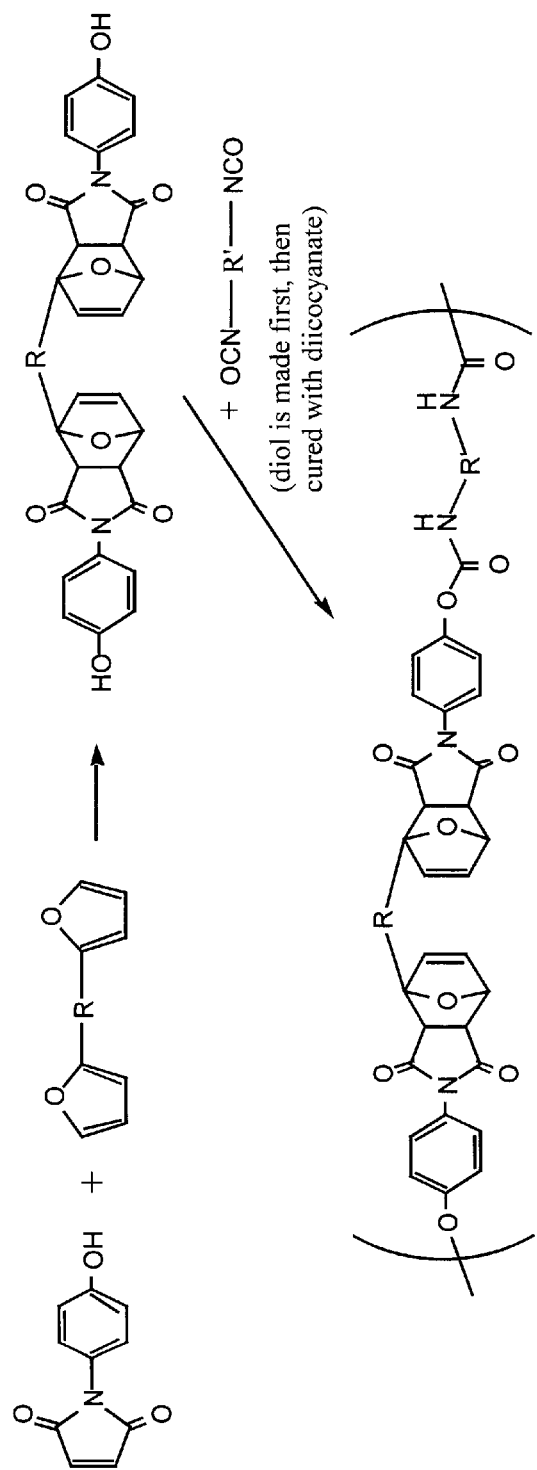
FIG. 5 shows one embodiment of the method of the present invention.

In another embodiment, illustrated in FIG. 5, a method is provided of making a thermally removable polyurethane by mixing a maleimide compound, functionalized with an alcohol with a furan compound, such as a bis-furan, a tris-furan or a tetrakis furan, to form a mixture and then curing this mixture with a diisocyanate at less than approximately 90° C. and preferably less than 60° C. The Diels-Alder adduct formed by the maleimide and furan are incorporated into the backbone of the polymer. Preferred are reactants in which a polymeric network is formed within approximately 10 minutes and most preferred are liquid reactants. The polymeric network formed can be depolymerized at approximately 90° C.

Figure 6:
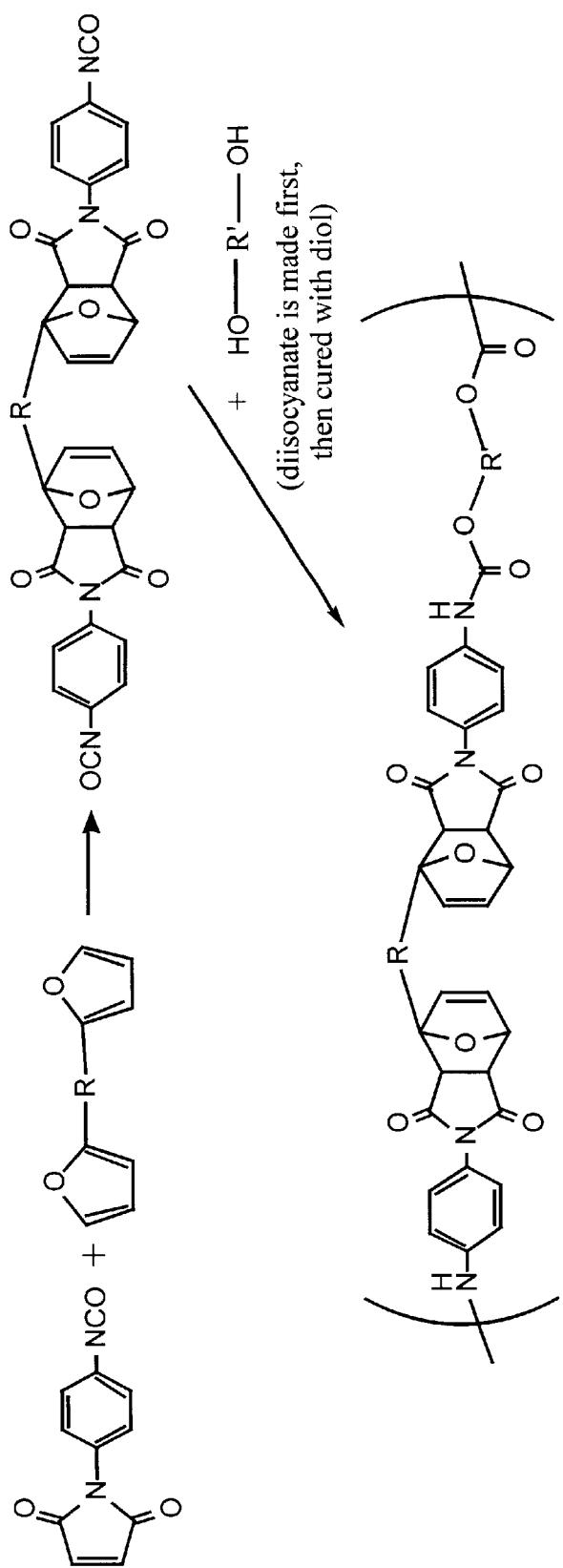
FIG. 6 shows one embodiment of the method of the present invention.

In another embodiment, illustrated in FIG. 6, a method is provided of making a thermally removable polyurethane by mixing a maleimide compound, functionalized with an isocyanate with a furan compound, such as a bis-furan, a tris-furan or a tetrakis furan, to form a mixture and then curing this mixture with a polyol at less than approximately 90° C. and preferably less than 60° C. The Diels-Alder adduct formed by the maleimide and furan are incorporated into the backbone of the polymer. Preferred are reactants in which a polymeric network is formed within approximately 10 minutes and most preferred are liquid reactants. The polymeric network formed can be depolymerized at approximately 90° C.

In other embodiments, both the furan, and the maleimide, can be functionalized. The furan can be functionalized with an alcohol and the maleimide with an isocyanate. When the two are mixed together, they cure into a polyurethane. Alternatively, the furan can be functionalized with an isocyanate and the maleimide with an alcohol. Again, when the two are mixed together, they cure into a polyurethane. Both the furan and maleimide can be functionalized with an alcohol and then cured with a diisocyanate. This Diels-Alder adduct can be preformed, and then cured, or all components can be mixed together. In yet another embodiment, both the furan and maleimide can be functionalized with an isocyanate and then cured with a polyol (such as a diol). This Diels-Alder adduct can be preformed, and then cured, or all components can be mixed together. Again, as in the previous embodiments, curing occurs when the compounds are mixed, at less than approximately 90° C. and preferably at approximately 60° C. The Diels-Alder adduct formed by the maleimide and furan are incorporated into the backbone of the polymer. Preferred are reactants in which a polymeric network is formed within approximately 10 minutes and most preferred are liquid reactants. The polymeric network formed can be depolymerized at approximately 90° C.

The important requirement of the invention is that the furan group, the maleimide group, and the polyol group or the isocyanate group be mixed together in a manner wherein the diol group and the isocyanate group reacts to form the urethane linkages and the monomeric furan group and the maleimide group react to form the thermally weak Diels-Alder adducts that are incorporated into the backbone of the urethane linkages during the formation of the polyurethane material.

By controlling the relative amounts of the furan compound, the maleimide compound, and the alcohol-containing compound, or the isocyanate-containing compound, the fraction of Diels-Alder adducts in the final material can be controlled. A smaller fraction of Diels-Alder adducts will produce larger molecular fragments when the polyurethane material is depolymerized upon heating in a solvent.

The use of small discrete monomers, as shown in FIG. 1 and FIG. 2, allows achievement of a wide range of properties in the crosslinked networks and of a wide range of curing and depolymerization temperatures. It is clear that networks can be made from more than a single maleimide, multifunctional furan, diol and isocyanate in a mixture. This increases the number of different materials that the method of the present invention can access and allows tailoring of the depolymerization properties.

In one method of preparation of a polyurethane material, bis(maleimide) compounds 5A (n=3 and n=4) were prepared and mixed with a furan functionalized with an alcohol, furfuryl alcohol, and a commercially available diisocyanate, 2,4-toluene-diisocyanate. All of these reactants are liquids at room temperature. The solid polyurethane product formed with several minutes. To demonstrate the depolymerization of the material, the polyurethane product was heated to 90° C., wherein the product softened, indicating the reversal of the Diels-Alder adduct to the furan and maleimide compounds. When the product was heated at 90° C. in a solvent, in this case n-butanol, the solid polyurethane product completely dissolved in the solvent. When the product was simply put in the n-butanol solvent at room temperature, no dissolution occurred, indicating that solvent alone is not responsible for any break-down of the product but that the depolymerization occurs because of the Diels-Alder thermally-weak links incorporated into the product by the method of the present invention.

EXAMPLES

Example 1

General Procedure for Preparation of Compounds 5A (n=3,4).

To a solution of dry THF was added either N-hydroxymethylmaleimide or 4-hydroxyphenylmaleimide (2 equivalents), $Et_3N$ (2 equivalents) and the desired α,ω-dichloro(hexa or octa) methylsiloxane (1 equivalent). The reaction mixture was stirred at room temperature under $N_2$ for four hours. The reaction mixture was then filtered through a sintered glass funnel and the collected inorganic salts were washed with copious amounts of $Et_2O$. The solvent was removed in vacuo and the crude product was taken up in $Et_2O$, washed with distilled water (3×), dried ($MgSO_4$), filtered, and concentrated to yield the desired bis-maleimide as either an oil or a solid.

Example 2

Hexamethyltrisiloxane-bis-1,7-(N-4-oxyphenylmaleimide) 5A (n=3).

Following the general procedure in Example 1, N-(4-hydroxyphenyl)-maleimide (22.83, 0.120 mol), $Et_3N$ (16.82 mL, 0.120 mol), THF (800 mL), and 1,5-dichlorohexamethyltrisiloxane (16.44 mL, 60.0 mmol), yielded 5A (n=3), (34.48 g, 98%) as clear brown oil. $^1H$ NMR (400 MHz, $CDCl_3$) δ 7.01 (d, J=8.0 Hz, 4H), 6.82 (d, J=8.0 Hz, 4H), 6.64 (s, 4H), 0.10 (s, 12H), 0.02 (s, 6H); $^{13}C$ NMR (100 MHz, $CDCl_3$) δ 169.6, 154.0, 134.0, 127.3, 124.6, 120.2, 0.8, −0.7.

Example 3

Octamethyltetrasiloxane-bis-1,7-(N-4-oxyphenylmaleimide) 5A (n=4)

Following the general procedure in Example 1, N-(4-hydroxyphenyl)maleimide (4.50 g, 23.8 mmol), $Et_3N$ (2.41 g, 23.8 mmol), THF (175 mL). and 1,7-Dichloro-octamethyltetrasiloxane (4.18 g, 11.9 mmol) yielded 5B (n=4), (7.59 g, 97%) as a clear yellow-brown oil. The product was used without further purification. $^1H$ NMR (400 MHz, $CDCl_3$) δ 7.17 (d, J=8.0 Hz, 4H), 6.96 (d, J=8.0 Hz, 4H), 6.82 (s, 4H), 0.25 (s, 12H), 0.10 (s, 12H); $^{13}C$ NMR (100 MHz, $CDCl_3$) δ 169.7, 154.2, 134.1, 127.4, 124.6, 120.4, 0.9, −0.5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of making a thermally-removable polyurethane, comprising the steps of:

preparing a furan compound with an alcohol functionality to form an alcohol-functionalized furan;

reacting an alcohol-functionalized furan compound with a bis(maleimide) compound to form a polyol;

reacting said polyol with an diisocyanate to form a mixture;

heating said mixture to a reaction temperature less than approximately 90° C. to form a gel; and cooling said gel to form a solid thermally-removable polyurethane material within approximately 10 minutes wherein the solid thermally-removable polyurethane material has the property that subsequent heating to a temperature greater than approximately 90° C. in a solvent will depolymerize the solid.

2. The method of claim 1 wherein the bis(maleimide) compound is a liquid at a temperature of approximately 60° C.

3. The method of claim 1 wherein the furan compound is a liquid at a temperature of approximately 60° C.

4. The method of claim 1 wherein the bis(maleimide) compound is selected from the group consisting of $C_4H_2O_2N)_2(CH_2)_6$, $((C_4H_2O_2N)C_6H_4)_2CH_2$, $((C_4H_2O_2N)C_6H_4)_2(SCH_2)_2$, $((C_4H_2O_2N)CH_2)_2(OSi(CH_3)_2)_2O$, $((C_4H_2O_2N)CH_2)_2(OSi(CH_3)_2)_3O$, $((C_4H_2O_2N)CH_2)_2(OSi(CH_3)_2)_4O$, $((C_4H_2O_2N)C_6H_4)_2(OSi(CH_3)_2)_3O$, and $((C_4H_2O_2N)C_6H_4)_2(OSi(CH_3)_2)_4O$.

5. The method of claim 1 wherein the solid polyerethane is depolymerized by dissolution in a polar solvent at a temperature greater than approximately 90° C.

6. The method of claim 5 wherein the polar solvent is selected from a group consisting of n-butanol, N,N-dimethylacetamide, methyl sulfoxide, and N,N-dimethylformamide.

7. The method of claim 1 wherein the diisocyanate compound is selected from the group consisting of toluene-2,4-diisocyanate, toluene-2,6-diisocyanate, diphenyl-4,4'-diisocyanate, diphenylmethane-4,4'-diisocyanate, 3,3'-dimethyldiphenyl-4,4'-diisocyanate, 3,3'-dimethoxydiphenyl-4,4'-diisocyanate, 3,3'-dichlorodiphenylmethane-4,4'-diisocyanate, chlorophenylene-2,4-diisocyanate, hexamethylene diisocyanate, naphthylene-1,5-diisocyanate, naphthylene-1,4-diisocyanate, naphthylene-2,7-diisocyanate, p-xylene diisocyanate, m-xylene diisocyanate, dicyclohexylmethane diisocyanate, 2-nitrodiphenyl-4,4'-diisocyanate, 2-nitrodiphenylmethane-4,4'-diisocyanate, diphenylmethanesulphone-4,4'-diisocyanate, diphenylsulphone-4,4'-diisocyanate, fluorene diisocyanate, and chrysene diisocyanate.

8. A method of making a thermally-removable polyurethane, comprising the steps of:
preparing a furan compound with an isocyanate functionality to form an isocyanate-functionalized furan;
reacting said isocyanate-functionalized furan with a bis (maleimide) compound to form a diisocyanate compound;
reacting said diisocyanate compound with a polyol to form a mixture;
heating said mixture to a reaction temperature less than approximately 90° C. to form a gel; and
cooling said gel to form a solid thermally-removable polyurethane material within approximately 10 minutes wherein the solid thermally-removable polyurethane material has the property that subsequent heating to a temperature greater than approximately 90° C. in a solvent will depolymerize the solid.

9. The method of claim 8 wherein the maleimide compound is a liquid at a temperature of approximately 60° C.

10. The method of claim 8 wherein the furan compound is a liquid at a temperature of approximately 60° C.

11. The method of claim 8 wherein the bis(maleimide) compound is selected from the group consisting of $C_4H_2O_2N)_2(CH_2)_6$, $((C_4H_2O_2N)C_6H_4)_2CH_2$, $((C_4H_2O_2N)C_6H_4)_2(SCH_2)_2$, $((C_4H_2O_2N)CH_2)_2(OSi(CH_3)_2)_4O$, $((C_4H_2O_2N)CH_2)_2(OSi(CH_3)_2)_3O$, $((C_4H_2O_2N)CH_2)_2(OSi(CH_3)_2)_4O$, $((C_4H_2O_2N)C_6H_4)_2(OSi(CH_3)_2)_3O$, and $((C_4H_2O_2N)C_6H_4)_2(OSi(CH_3)_2)_4O$.

12. The method of claim 8 wherein the solid polyerethane is depolymerized by dissolution in a polar solvent at a temperature greater than approximately 90° C.

13. The method of claim 12 wherein the polar solvent is selected from a group consisting of n-butanol, N,N-dimethylacetamide, methyl sulfoxide, and N,N-dimethylformamide.

14. The method of claim 8 wherein the polyol is selected from the group consisting of glycerol, triethanolamine, pentaerythritol, diethylene glycol, ethylene glycol, 1,3-propane diol, 1,4-butane diol, 1,5-pentane diol, 1,6-hexane diol, p-bis(β-hydroxyethoxy)benzene, trimethylolpropane, 1,2-propylene glycol, and polypropylene glycol.

15. A method of making a thermally-removable polyurethane, comprising the steps of:
reacting an alcohol-functionalized maleimide with a compound containing at least two furan groups to form a polyol;
reacting said polyol with an diisocyanate to form a mixture;
heating said mixture to a reaction temperature less than approximately 90° C. to for a gel; and
cooling said gel to form a solid thermally-removable polyurethane material within approximately 10 minutes wherein the solid thermally-removable polyurethane material has the property that subsequent heating to a temperature greater than approximately 90° C. in a solvent will depolymerize the solid.

16. The method of claim 15 wherein the maleimide compound is a liquid at a temperature of approximately 60° C.

17. The method of claim 15 wherein the furan compound is a liquid at a temperature of approximately 60° C.

18. The method of claim 15 wherein the furan compound is selected from the group consisting of $((C_4H_3O)CH_2O)_4(SiCH_3)_2$, $(((C_4H_3O)CH_2O)CO)_3C_6H_3$, $((C_4H_3O)CH_2O)_3SiCH_3$, $((C_4H_3O)CH_2O)_3SiC_6H_{11}$, $((C_4H_3O)CH_2O)_3SiC_6H_5$, and $((C_4H_3O)CH_2O)_4Si$.

19. The method of claim 15 wherein the solid polyerethane is depolymerized by dissolution in a polar solvent at a temperature greater than approximately 90° C.

20. The method of claim 19 wherein the polar solvent is selected from a group consisting of n-butanol, N,N-dimethylacetamide, methyl sulfoxide, and N,N-dimethylformamide.

21. The method of claim 15 wherein the diisocyanate compound is selected from the group consisting of toluene-2,4-diisocyanate, toluene-2,6-diisocyanate, diphenyl-4,4'-diisocyanate, diphenylmethane-4,4'-diisocyanate, 3,3'-dimethyldiphenyl-4,4'-diisocyanate, 3,3'-dimethoxydiphenyl-4,4'-diisocyanate, 3,3'-dichlorodiphenylmethane-4,4'-diisocyanate, chlorophenylene-2,4-diisocyanate, hexamethylene diisocyanate, naphthylene-1,5-diisocyanate, naphthylene-1,4-diisocyanate, naphthylene-2,7-diisocyanate, p-xylene diisocyanate, m-xylene diisocyanate, dicyclohexylmethane diisocyanate, 2-nitrodiphenyl-4,4'-diisocyanate, 2-nitrodiphenylmethane-4,4'-diisocyanate, diphenylmethanesulphone-4,4'-diisocyanate, diphenylsulphone-4,4'-diisocyanate, fluorene diisocyanate, and chrysene diisocyanate.

22. A method of making a thermally-removable polyurethane, comprising the steps of:
reacting an isocyanate-functionalized maleimide with a compound containing at least two furan groups to form a polyisocyanate compound;
reacting said polyisocyanate compound with a polyol to form a cured mixture;
heating said cured mixture to a reaction temperature less than approximately 90° C., to for a gel; and
cooling said gel to form a solid thermally-removable polyurethane within approximately 10 minutes material wherein the solid thermally-removable polyurethane material has the property that subsequent heating to a temperature greater than approximately 90° C. in a solvent will depolymerize the solid.

23. The method of claim 22 wherein the maleimide compound is a liquid at a temperature of approximately 60° C.

24. The method of claim 22 wherein the furan compound is a liquid at a temperature of approximately 60° C.

25. The method of claim 22 wherein the furan compound is selected from the group consisting of $((C_4H_3O)CH_2O)_4(SiCH_3)_2$, $(((C_4H_3O)CH_2O)CO)_3C_6H_3$, $((C_4H_3O)CH_2O)_3SiCH_3$, $((C_4H_3O)CH_2O)_3SiC_6H_{11}$, $((C_4H_3O)CH_2O)_3SiC_6H_5$, and $((C_4H_3O)CH_2O)_4Si$.

26. The method of claim 22 wherein the solid polyerethane is depolymerized by dissolution in a polar solvent at a temperature greater than approximately 90° C.

27. The method of claim 26 wherein the polar solvent is selected from a group consisting of n-butanol, N,N-dimethylacetamide, methyl sulfoxide, and N,N-dimethylformamide.

28. The method of claim 22 wherein the polyol is selected from the group consisting of glycerol, triethanolamine, pentaerythritol, diethylene glycol, ethylene glycol, 1,3-propane diol, 1,4-butane diol, 1,5-pentane diol, 1,6-hexane diol, p-bis(β-hydroxyethoxy)benzene, trimethylolpropane, 1,2-propylene glycol, and polypropylene glycol.

29. A method of making a thermally-removable polyurethane, comprising reacting a maleimide compound functionalized with an alcohol with a furan compound functionalized with an isocyanate at a reaction temperature less than approximately 90° C. to form a solid thermally-removable polyurethane within approximately 10 minutes material wherein the solid thermally-removable polyurethane material has the property that subsequent heating to a temperature greater than approximately 90° C. in a solvent will depolymerize the solid.

30. A method of making a thermally-removable polyurethane, comprising reacting a maleimide compound functionalized with an isocyanate and a furan compound functionalized with alcohol at a reaction temperature less than approximately 90° C. to form a solid thermally-removable polyurethane within approximately 10 minutes material wherein the solid thermally-removable polyurethane material has the property that subsequent heating to a temperature greater than approximately 90° C. in a solvent will depolymerize the solid.

31. A method of making a thermally-removable polyurethane, comprising reacting a maleimide compound functionalized with an alcohol, a furan compound functionalized with an alcohol, and a diisocyanate at a reaction temperature less than approximately 90° C. to form a solid thermally-removable polyurethane within approximately 10 minutes material wherein the solid thermally-removable polyurethane material has the property that subsequent heating to a temperature greater than approximately 90° C. in a solvent will depolymerize the solid.

32. A method of making a thermally-removable polyurethane, comprising reacting a maleimide compound functionalized with an isocyanate, a furan compound functionalized with an isocyanate, and a polyol at a reaction temperature less than approximately 90° C. to form a solid thermally-removable polyurethane within approximately 10 minutes material wherein the solid thermally-removable polyurethane material has the property that subsequent heating to a temperature greater than approximately 90° C. in a solvent will depolymerize the solid.

* * * * *